United States Patent
Gao et al.

(10) Patent No.: US 12,271,433 B2
(45) Date of Patent: Apr. 8, 2025

(54) PROCESSING METHOD AND APPARATUS BASED ON INTEREST TAG, AND DEVICE AND STORAGE MEDIUM

(71) Applicant: BEIJING ZITIAO NETWORK TECHNOLOGY CO., LTD., Beijing (CN)

(72) Inventors: Wenyang Gao, Beijing (CN); Shu Chen, Beijing (CN); Zeyu Li, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/520,669

(22) Filed: Nov. 28, 2023

(65) Prior Publication Data

US 2024/0095293 A1    Mar. 21, 2024

Related U.S. Application Data

(63) Continuation of application No. PCT/CN2022/102175, filed on Jun. 29, 2022.

(30) Foreign Application Priority Data

Jul. 26, 2021 (CN) .......................... 202110845885.5

(51) Int. Cl.
G06F 16/9538 (2019.01)
G06F 16/9535 (2019.01)

(52) U.S. Cl.
CPC ...... *G06F 16/9538* (2019.01); *G06F 16/9535* (2019.01)

(58) Field of Classification Search
CPC .................. G06F 16/9538; G06F 16/9535
See application file for complete search history.

(56) References Cited

U.S. PATENT DOCUMENTS 6,826,559 B1 * 11/2004 Ponte .................. G06F 16/9538
707/999.005
8,533,134 B1 * 9/2013 Zhao ....................... G06F 16/35
706/12

(Continued)

FOREIGN PATENT DOCUMENTS

| CN | 103218158 A | 7/2013 |
|---|---|---|
| CN | 103823631 A | 5/2014 |

(Continued)

OTHER PUBLICATIONS

International Search Report (with English translation) and Written Opinion issued in PCT/CN2022/102175, dated Sep. 27, 2022, 11 pages provided.

(Continued)

*Primary Examiner* — Mark E Hershley
(74) *Attorney, Agent, or Firm* — Fish & Richardson P.C.

(57) ABSTRACT

Disclosed in embodiments of the present invention are a processing method and apparatus based on an interest tag, a device, and a storage medium. The method comprises: in a process of displaying an information flow in a preset application program, detecting that an interest tag display event is triggered; and displaying a first page, and dynamically switching and displaying, in the first page, different subsets in a preset interest tag set, wherein the number of interest tags in the subsets is more than one and is smaller than the total number of interest tags in the preset interest tag set.

19 Claims, 4 Drawing Sheets

(56) References Cited

U.S. PATENT DOCUMENTS

| | | | |
|---|---|---|---|
| 8,954,358 B1* | 2/2015 | Zhang | G06F 18/23 706/12 |
| 9,305,084 B1* | 4/2016 | McCann | G06F 16/954 |
| 9,635,337 B1* | 4/2017 | Dantzler | G06F 16/735 |
| 9,723,367 B1* | 8/2017 | Long | H04N 21/4751 |
| 2008/0071929 A1* | 3/2008 | Motte | H04L 67/53 709/217 |
| 2009/0228774 A1* | 9/2009 | Matheny | G06F 16/954 715/201 |
| 2009/0313295 A1* | 12/2009 | Blaxland | G06Q 30/02 715/810 |
| 2010/0094703 A1* | 4/2010 | Bramley | G06Q 30/0255 715/823 |
| 2012/0066638 A1* | 3/2012 | Ohri | G06F 3/0485 715/784 |
| 2012/0109778 A1* | 5/2012 | Chan | G06Q 30/0631 705/26.7 |
| 2012/0123865 A1* | 5/2012 | Salzano | G06Q 30/0257 705/26.4 |
| 2012/0123978 A1* | 5/2012 | Toderice | G06V 20/70 706/12 |
| 2013/0178962 A1* | 7/2013 | DiMaria | G06F 3/04842 700/94 |
| 2013/0254308 A1* | 9/2013 | Rose | H04N 21/26258 709/206 |
| 2013/0268485 A1* | 10/2013 | Cao | G06F 16/9538 707/722 |
| 2014/0359656 A1* | 12/2014 | Banica | H04N 21/234 725/32 |
| 2014/0365481 A1* | 12/2014 | Novosel | G06F 16/951 707/728 |
| 2015/0234813 A1* | 8/2015 | Knapp | G06F 16/14 707/722 |
| 2017/0235828 A1* | 8/2017 | Philipose | H04N 21/2665 725/115 |
| 2018/0014037 A1* | 1/2018 | Venkatraman | G06F 16/78 |
| 2018/0232592 A1* | 8/2018 | Stewart | G08B 13/19606 |
| 2018/0246983 A1* | 8/2018 | Rathod | G06F 16/972 |
| 2019/0026313 A1* | 1/2019 | Zhang | G06F 16/00 |
| 2019/0286744 A1* | 9/2019 | Wang | G06F 16/2246 |
| 2020/0021872 A1* | 1/2020 | Venkatraman | H04N 21/2668 |
| 2020/0051025 A1* | 2/2020 | Gerace | G06Q 30/0273 |
| 2022/0317838 A1 | 10/2022 | Yu et al. | |

FOREIGN PATENT DOCUMENTS

| | | |
|---|---|---|
| CN | 105607839 A | 5/2016 |
| CN | 105892848 A | 8/2016 |
| CN | 106933481 A | 7/2017 |
| CN | 109189954 A | 1/2019 |
| CN | 109542295 A | 3/2019 |
| CN | 109710139 A | 5/2019 |
| CN | 110568974 A | 12/2019 |
| CN | 110647264 A | 1/2020 |
| CN | 110941740 A | 3/2020 |
| CN | 111291220 A | 6/2020 |
| CN | 111752440 A | 10/2020 |
| CN | 112631480 A | 4/2021 |
| CN | 113553507 A | 10/2021 |
| JP | 2011504620 A | 2/2011 |
| WO | 2019171306 A1 | 9/2019 |

OTHER PUBLICATIONS

Office Action issued in Chinese Application No. 202110845885.5, mailed Dec. 6, 2023, with English translation.

Office Action issued in Chinese Application No. CN202110845885.5, dated Nov. 9, 2022, with machine translation.

Notice of Reasons for Refusal for Japanese Application No. 2023-573184, mailed Nov. 19, 2024, 9 pages.

* cited by examiner

PROCESSING METHOD AND APPARATUS BASED ON INTEREST TAG, AND DEVICE AND STORAGE MEDIUM

CROSS-REFERENCE TO RELATED APPLICATIONS

This application is a continuation of International Application No. PCT/CN2022/102175, filed on Jun. 29, 2022, which claims priority to Chinese Patent Application No. 202110845885.5 filed on Jul. 26, 2021. Both of the aforementioned applications are incorporated by reference herein in their entirety.

TECHNICAL FIELD

Embodiments of the present disclosure relate to the field of computer technologies, for example an interest tag based processing method, apparatus, device, and storage medium.

BACKGROUND

With the rapid development of information technology and the popularization of mobile internet, more and more network information can be provided for users by applications, so that it is difficult for the users to quickly find contents they are interested in, which results in inefficient interaction.

Currently, for some applications, when a user uses an application for the first time, interest tags can be presented to the user. The interest tags can be used to identify recommended contents that the user might be interested in, such as sports or history, and the user can select the interest tags according to his/her actual preference, which is convenient for the application to better recommend content to the user.

However, the current interest tag based processing solutions are still not satisfactory and need to be improved.

SUMMARY

The embodiments of the present disclosure provide a processing method and apparatus based on interest tag, storage medium and device, which can improve processing solutions based on interest tag in the related art.

In a first aspect, an embodiment of the present disclosure provides a processing method based on interest tag, comprising:
  detecting that an interest tag presentation event is triggered in a process of presenting information streams in a preset application;
  responsive to the first preset operation, displaying a first page, and dynamically switching presentations of different subsets of a preset interest tag set in the first page, wherein a number of interest tags in each of the subsets is more than one and less than a total number of interest tags in the preset interest tag set.

In a second aspect, an embodiment of the present disclosure provides a processing apparatus based on interest tag, comprising:
  a trigger detecting module, configured to detect whether an interest tag presentation event is triggered in the process of presenting information streams in a preset application;
  an interest tag presenting module, configured to display a first page when it is detected that the interest tag presentation event is triggered, and dynamically switch presentations of different subsets of a preset interest tag set in the first page, wherein the number of interest tags in each of the subsets is more than one and less than a total number of the interest tags in the preset interest tag set.

In a third aspect, an embodiment of the present disclosure provides a computer readable storage medium, on which a computer program is stored, the program, when executed by a processor, implementing the processing method based on interest tag as provided in the embodiment of the present disclosure.

In a fourth aspect, an embodiment of the present disclosure provides an electronic device, comprising a memory, a processor, and a computer program stored in the memory and executable on the processor, the processor, when executing the computer program, implementing the processing method based on interest tag as provided in the embodiment of the present disclosure.

DETAILED DESCRIPTION

Figure 1:
FIG. 1 is a schematic diagram of displaying interest tags in the related art.

Embodiments of the present disclosure will be described in more detail below with reference to the accompanying drawings. While certain embodiments of the present disclosure are shown in the drawings, it should be understood that the present disclosure may be implemented in various forms and should not be construed as being limited to the embodiments set forth herein, but rather these embodiments are provided for a more thorough and complete understanding of the present disclosure. It should be understood that the drawings and the embodiments of the present disclosure are for illustration purposes only and are not intended to limit the scope of the present disclosure.

It should be understood that the various steps recited in embodiments of the method of the present disclosure can be performed in different orders, and/or performed in parallel. Moreover, embodiments of the method can include additional steps and/or omit performing the illustrated steps. The scope of the present disclosure is not limited in this respect.

The term "including" and variations thereof as used herein are intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that "first", "second", and other concepts mentioned in the present disclosure are only used for distinguishing different apparatuses, modules or units, and are not used for limiting the order or mutual interdependent relations of the functions performed by these apparatuses, modules or units.

It should be noted that definitions of "one" or "more" as mentioned in the present disclosure are intended to be illustrative rather than limiting. Those skilled in the art should understand that it should be understood as "one or more", unless the context clearly indicates otherwise.

The names of messages or information exchanged between apparatuses in the embodiments of the present disclosure are for illustrative purposes only, and are not intended to limit the scope of these messages or information.

In the following embodiments, each embodiment provides exemplary features and an example, and a plurality of features described in the embodiments may be combined to form a plurality of exemplary solutions. Each numbered embodiment should not be regarded as only one technical solution.

In order to facilitate understanding of the technical solutions and the corresponding technical effects of the embodiments of the present disclosure, the following description is made of related technologies. FIG. 1 is a schematic diagram of displaying interest tags in the related art. As shown in FIG. 1, the interest tags are displayed in a static mode in a single page, and because of limited space of the page, the number of interest tags that can be displayed is greatly limited. Only 9 interest tags are shown in FIG. 1. It can be learned that, in the related art, the presentation mode of the interest tags will result in deficiency in number of displayable interest tags, that is to say, there are few interest tags that can be selected by the user, which goes against accurate determination of the user's interest. Moreover, the display mode is tedious, which leads to poor interactive experience. In addition, in the related art, the above page is presented only when an application is used for the first time, and the user cannot change the selected interest tags after selection.

Figure 2:
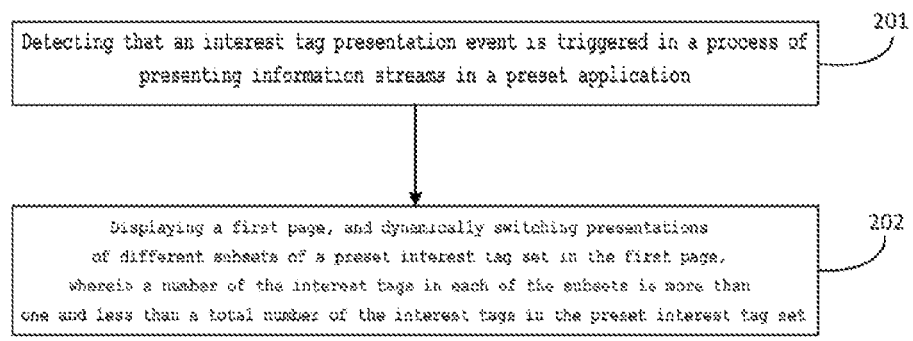
FIG. 2 is a schematic flowchart of a processing method based on interest tag as provided in an embodiment of the present disclosure.

FIG. 2 is a schematic flowchart of a processing method based on interest tag as provided in an embodiment of the present disclosure. The method can be performed by a processing apparatus based on interest tag, wherein the apparatus can be implemented by software and/or hardware, and generally can be integrated in an electronic device. As shown in FIG. 2, the method comprises:

Step 201, in the process of presenting information streams in a preset application, detecting that an interest tag presentation event is triggered.

In the embodiment of the present disclosure, the preset application can provide an interest tag presentation function, whose type is not limited, and can be installed in an electronic device such as a mobile phone, a tablet computer, or a computer. The interest tag can be understood as a tag for identifying recommended content that the user might be interested in, and is generally named by related information such as a type of the recommended content or the involved field. The preset application can generally have a content recommendation function, and the recommended content can include resources in various forms, such as videos, information, articles, novels, news, music, or commodities.

Illustratively, the information streams can include, for example, a video stream, an audio stream, an image stream, a text stream, a graphics stream, or the like, which can be matched with the recommended content of the preset application. The interest tag presentation event can be understood as an event to present interest tags in the preset application.

A specific trigger mode is not limited, which can be an active trigger by a user or an automatic trigger by the preset application. The user can trigger the interest tag presentation event by means of inputting a preset trigger operation. The preset trigger operation can be understood as an operation for triggering the interest tag presentation event. Specific operation type, action mode and the like are not limited, and can be designed according to the characteristics of the preset application itself. It should be explained that, the number of times of the preset trigger operation is not limited, and can be, for example, a single operation, or multiple operations within a set time period. For example, an interest tag presentation control (for example, a touch button) can be provided, and the preset trigger operation can be a trigger operation that is input by the user and acts on the interest tag presentation control, that is to say, the user can actively trigger the interest tag presentation event by means of actively triggering the control, which then is generally applicable to a situation where the user desires to autonomously select the interest tags. For another example, an automatic trigger condition for the interest tag presentation event can be provided, and in the case where the automatic trigger condition is met, the interest tag presentation event can be automatically triggered by the preset application, which is generally applicable to a situation where the preset application automatically reminds the user to select interest tags. Illustratively, the automatic trigger condition can be, for example, that the number of times that the user successively ignores or closes the content recommended by the preset application reaches a preset number threshold, which indicates that the current user may not be interested in the recently recommended content. In order to improve the accuracy of recommendation, the preset application can automatically trigger the interest tag presentation event.

Step 202, displaying a first page, and dynamically switching presentations of different subsets of a preset interest tag set in the first page, wherein the number of interest tags in each of the subsets is more than one and less than a total number of interest tags in the preset interest tag set.

Illustratively, the first page can be understood as a page for presenting interest tags in a preset application. The preset interest tag set can be understood as a set of multiple preset interest tags that need to be presented to the current user, and specifically which interest tags are included can be determined by referring to characteristics of the preset application or related information of the current user.

Illustratively, different subsets can be formed according to multiple interest tags in the preset interest tag set, where each of the subsets includes multiple interest tags, and the number of the interest tags in the subset is less than a total number of the interest tags in the preset interest tag set. There can or cannot be an intersection between different subsets. For example, the number of interest tags in the subset can be determined according to a size of display space of the first page.

For example, the subsets can be obtained by dividing in advance, for example, the interest tags in the preset interest tag set are divided into a plurality of subsets in advance. The interest tags in a single subset can be presented simultaneously, and one subset is presented each time. When presentations of different subsets are dynamically switched, a transition stage can exist, that is to say, when presentation of a subset A is switched to presentation of a subset B, part of the interest tags in the subset A and part of the interest tags in the subset B can be simultaneously presented in the transition stage.

For example, the subsets can also be obtained by dynamically dividing according to the current dynamic presentation situations. For example, the interest tags in the preset interest tag set can be presented in the first page according to a preset order or randomly, and the currently presented interest tags in the first page can be considered to belong to one subset. For another example, the interest tags in the preset interest tag set can be presented in a moving form in the first page, for example, the interest tags appear from a left boundary, move to a right boundary, and then disappear from the right boundary in the first page. In this way, the interest tags presented in the first page are dynamically changed, and the interest tags currently presented in the first page can be considered to belong to one subset.

Illustratively, after the first page is displayed, the capability of dynamically switching presentations of different subsets of the preset interest tag set in the first page is turned on, and a specific process of dynamically switching presentations can be automatically controlled by the preset application. For example, the preset interest tag set is played in the first page by moving (such as sliding) in a preset direction, or a user autonomous control of the dynamic switching of presentations can be realized in cooperation with the user's operation (such as a slide operation), and the like.

In the processing method based on interest tag as provided in the embodiment of the present disclosure, in the process of presenting information streams in a preset application, it is detected that an interest tag presentation event is triggered, a first page is displayed, and presentations of different subsets of a preset interest tag set are dynamically switched in the first page, wherein the number of interest tags in each of the subsets is more than one and less than the total number of interest tags in the preset interest tag set. By adopting the above technical solution, the interest tags can be presented in the process of presenting information streams by the preset application, so that a user can have an opportunity to dynamically adjust the interest tags in the process of using the preset application. By means of dynamically switching presentations of different interest tag subsets, more interest tags can be presented to the user, utilization of page display space can be improved, the presentation effect of the interest tags can be optimized, and the interactivity and interestingness can be enhanced.

For example, in the process of presenting interest tags, a tag selection operation can be received based on the first page, target interest tags can be determined according to an acted object corresponding to the tag selection operation, and content recommendation can be performed based on the target interest tags.

The interest tag can be presented in form of a control, for example, a touch button, and the tag selection operation can be, for example, a click, a double click, a long press, or the like acting on the interest tag. Multiple selections of interest tags can be supported, and when a first interest tag is selected, the display state of the first interest tag can be changed, such as changing the background color of the interest tag.

It should be noted that, because the interest tag has a certain size, in the process of dynamically switching presentations, there might be a situation where a certain interest tag cannot be completely presented, and at this time, whether the interest tag is allowed to be selected can be determined according to the displayed proportion of the interest tag. Illustratively, receiving a tag selection operation based on a first page and determining a target interest tag according to an acted object corresponding to the tag selection operation can include: receiving a tag selection operation based on a first page, and when it is determined that an acted object corresponding to the tag selection operation is a first interest tag, if a displayed proportion (for example, obtained by calculating a quotient of a displayed area and a total tag area) of the first interest tag is greater than a preset proportion threshold, then determining the first interest tag as a target interest tag. The preset proportion threshold can be, for example, 0.6.

In some embodiments, the displaying a first page and dynamically switching presentations of different subsets of a preset interest tag set in the first page includes: displaying a first page, and presenting a first subset of a preset interest tag set in the first page; receiving a first preset operation based on the first page; and dynamically switching to presentation of a second subset of the preset interest tag set in the first page according to the action direction and/or action speed of the first preset operation. The preset application provides the capability of dynamically switching presentations of the interest tags, and dynamic switching of presentations is performed according to the first preset operation input by a user, so that the presentation effect is more conformable to personal requirements of the user.

Illustratively, the first subset can be any subset of the preset interest tag set. For example, the interest tags in the preset interest tag set can be sorted according to a preset order, and the preset order can be determined, for example, according to a probability that the interest tag is selected by the current user, which is predicted by the preset application, for example, an interest tag with a high probability can be preferentially presented. For example, the interest tags in the first subset can include interest tags with sequence numbers in the sorting that are greater than a preset sequence number threshold.

Illustratively, the first preset operation can be a slide operation, and the slide operation can be a left slide, a right slide, an up slide, a down slide or other operation. The dynamic switching mode can be determined according to a direction of action of the first preset operation, for example, a position of appearance or a moving direction of the interest tag in the second subset can be determined. For example, when the slide operation is a left slide, the interest tags in the first subset gradually disappear from the left boundary of the first page, and the interest tags in the second subset gradually appear from the right boundary of the first page. Of course, the first preset operation can also be other types of operations, such as pressing the screen with two or more fingers and sliding in a direction toward the edge of the screen or sliding in a direction toward the center of the screen. If sliding in the direction toward the edge of the screen, the interest tags in the first subset gradually disappear from the peripheral boundary of the first page, and the interest tags in the second subset gradually appear from the central area of the first page.

Illustratively, a speed of the dynamic switching can be determined according to a speed of the action of the first preset operation, for example, the speed of the dynamic switching is in a positive proportional relation with the speed of the action of the first preset operation. Still taking the slide operation as an example, when the user presses the screen and slides quickly, the interest tags in the second subset also appear quickly in the first page accordingly.

In some embodiments, the dynamically switching presentations of different subsets of a preset interest tag set in the first page includes: playing a preset interest tag set by automatically sliding in a preset direction in the first page to realize dynamic switching of presentations among different subsets, wherein, the interest tags in the preset interest tag set are sorted in a preset sorting mode. In this way, automatic cycle of dynamic switching of presentations of the preset interest tag set can be supported.

For example, the automatic slide-playing can specifically be roll-playing, and the roll-playing can be understood as displaying the sorted interest tags in the preset interest tag set in a certain direction continuously and cyclically by sliding, that is, the same interest tag has an opportunity of appearing at least twice. At this time, the certain direction is the preset direction, and the preset direction can be set according to actual requirements, and can be transverse or longitudinal, specifically, such as from left to right or from up to down, etc. The interest tags in the preset interest tag set are sorted in a preset sorting mode, and the preset sorting mode can be, for example, a matrix sorting mode or a honeycomb sorting mode, and can also be other modes, which are not limited specifically.

Illustratively, when the automatic slide-playing is performed, the playing can be performed according to a preset automatic slide speed, and the preset automatic slide speed can decide a speed at which a new interest tag appears in the first page, and the specific value can be set according to actual requirements. For example, the sorted interest tags can be grouped according to a preset direction to obtain multiple interest tag groups. For example, if the preset direction is transverse, each group can include one or more rows of interest tags, and the preset automatic slide speeds corresponding to different interest tag groups can be different, which can further improve the display effect and enhance the interestingness.

In some embodiments, in the process of playing the preset interest tag set by automatically sliding in a preset direction in the first page, the method further includes: judging whether a playing pause condition is met or not, and statically presenting a third subset of the preset interest tag set in the first page based on a judgment result that the playing pause condition is met. The playing pause condition can be, for example, that the playing time period reaches a preset playing time period threshold, that the presentation of the interest tags in the preset interest tag set is completed (for example, each of the interest tags in the preset interest tag set has been presented at least once), or that a pause operation input by the user is received.

In some embodiments, in the process of playing the preset interest tag set by automatically sliding in a preset direction in the first page, the method further includes: receiving a second preset operation based on the first page; and responsive to the second preset operation, statically presenting a third subset of the preset interest tag set in the first page. The user can interrupt the automatic slide-playing by inputting the second preset operation and switch to the static display mode, so as to facilitate the user to select the interest tags according to the operation mode familiar to the user. The second preset operation can be, for example, a touch operation, such as a slide operation, a click operation, a long-press operation, or the like.

Illustratively, the third subset can be any subset of the preset interest tag set, and can be the same as the first subset described above, for example, without limitation.

In some embodiments, the third subset is the same as the subset being presented in the first page when the second preset operation is received. For the interest tags which the user does not want to select, they can automatically disappear from the first page by automatic slide-playing. When the interest tags which the user wants to select or the interest tags which the user hesitates to select appear, the automatic slide-playing can be paused, that is, the currently displayed interest tags are kept unchanged, thus making it easier for the user to select the interest tags and improving convenience of operations.

In some embodiments, after the third subset of the preset interest tag set is presented in a static form in the first page, the method further includes: receiving a third preset operation based on the first page; dynamically switching to presentation of a fourth subset of the preset interest tag set in the first page according to a direction and/or a speed of the action of the third preset operation. After pausing the automatic slide-playing, the user can continue to dynamically switch presentations of different subsets through autonomous operations, so that the presentation effect is more conformable to the personal requirements of the user. The number of the fourth subset is not limited, and dynamically switching to presentation of the fourth subset of the preset interest tag set can also be understood as continuing to slide-play the preset interest tag set under the autonomous operations of the user. When the user lifts his/her hands, the playing is paused. The working mode and working principle of the third preset operation can be similar to those of the first preset operation, and reference can be made to the related description of the first preset operation, which is not described herein again. The third preset operation can be the same as or different from the first preset operation, for example, the third preset operation and the first preset operation are both transverse slides, or the first preset operation is a transverse slide and the third preset operation is a longitudinal slide, etc.

In some embodiments, a preset playing control can be displayed in the first page, a trigger operation acting on the preset playing control is received, and the preset interest tag set continues to be automatically slide-played in a preset direction.

In some embodiments, before displaying the first page, the method can further include: determining at least one of the number, the tag content and the sorting sequence of the interest tags in the preset interest tag set according to a recommended content browsing history and/or a feedback to the historical recommended content of the current user. In this way, in the process of using the preset application by the user, the preset interest tag set can be dynamically adjusted according to the recommended content browsing history and/or the feedback to the historical recommended content of the user, so that the preset interest tag set can be better matched with the current state of the current user.

Illustratively, the recommended content browsing history can include historical recommended content that the user has browsed through, interest tags corresponding to the historical recommended content, time periods since the user browsed through a plurality of historical recommended contents to a current time, and the like. The feedback to the historical recommended content can include completing browsing of the historical recommended content, switching to other recommended content before browsing of the historical recommended content is completed, giving the historical recommended content a like, commenting on the historical recommended content, forwarding the historical recommended content, and selecting to block recommendations relevant to the historical recommended content, and the like.

Illustratively, the tag content of the interest tag can be understood as a tag name, and can be copywriting when the interest tag is presented to the user, and can specifically include texts, symbols, graphics, or the like. For example, the tag content includes "basketball", and can further include a basketball pattern, which helps the user accurately understand the meaning of the interest tag. Determining the tag contents of the interest tags in the preset interest tag set can be understood as determining which interest tags are specifically included in the preset interest tag set. The interest tags which might be selected by the user can be predicted according to the recommended content browsing history and/or the feedback to the historical recommended content, so that the corresponding tag contents are determined, and the number of the interest tags can be further determined.

Illustratively, the probability that a candidate interest tag is selected by a current user can be predicted according to the recommended content browsing history and/or the feedback to the historical recommended content. When the number of the interest tags in the preset interest tag set is determined as a preset number (for example, 20), the candidate interest tags can be sorted in a descending order with respect to the probabilities, and the candidate interest tags having a sequence number larger than or equal to a preset sequence number (the preset sequence number is equal to the preset number, for example, the first 20) are determined as the interest tags that need to be included in the preset interest tag set, so that the corresponding tag contents are determined. When the number of the interest tags in the preset interest tag set is uncertain, the candidate interest tags with the corresponding probabilities larger than a preset probability threshold can be determined as the interest tags that need to be included in the preset interest tag set, and then the number of the interest tags and the corresponding tag contents are determined. The sorting order of the interest tags can also be determined according to the probabilities, for example, the interest tag with a higher probability is preferentially presented, and the like.

In some embodiments, the preset application includes a video recommendation application, the first page includes a page for playing a recommended video, and the preset interest tag set is included in video content of a target recommended video. For the video recommendation application, incorporating the preset interest tag set in the video content of the target recommended video for dynamic presentation by multiplexing the page for playing the recommended video is conformable to the video viewing habit of users, and does not require additional development of a new page, which saves the development cost. It should be noted that, if the page for playing the recommended video contains controls which are irrelevant to the interest tags, such as a control for giving a like, a comment control, or a share control, or anchor jump links, such controls and anchor jump links can be shielded from being displayed, thereby preventing unnecessary interferences to the user.

In some embodiments, the detecting that the interest tag presentation event is triggered includes: receiving an operation of switching to a next recommended video, and waiting until a current video to be recommended in a queue of videos to be recommended being the target recommended video; the displaying a first page and dynamically switching presentations of different subsets of a preset interest tag set in the first page includes: displaying a first page, and playing the target recommended video in the first page to realize dynamic switching of presentations of different subsets of a preset interest tag set in the first page. When interest tags need to be presented, the target recommended video can be inserted into the queue of videos to be recommended as a next video to be recommended, and switching to playing of the target recommended video is realized according to the video switching mode of the video recommendation application, which, for a user, is equivalent to switching between videos. Interruption feeling can be weakened, interestingness can be enhanced, and interactive experience can be further improved.

In some embodiments, the method further comprises: in a case of determining that the interest tag selection is completed, when a first preset condition is met, switching to displaying of a second page, and playing a next recommended video of the target recommended video in the second page; receiving a fourth preset operation in the preset application, wherein the fourth preset operation includes an operation of switching to a last recommended video; and responsive to the fourth preset operation, displaying the first page, and displaying prompt information of completion of the tag selection in the first page. In this way, it is compatible with the video switching logic of the video recommendation application, a situation where the user returns to confirm the tag selection can be supported, and the operation habit of the user can be complied.

Illustratively, after selecting several interest tags, the user can input an instruction for completion of the interest tag selection by triggering a control such as "determined" or "selected", and then a first preset condition can be judged, and whether to play a next recommended video can be determined. A case where the first preset condition is met can include, for example, that the user actively triggers playing the next recommended video, or that a preset time period has passed since an instruction for completion of the interest tag selection is received, and thus the next recommended video is automatically played.

In some embodiments, the method can further comprise: in a case of determining that the interest tag selection is not completed, when a second preset condition is met, switching to displaying of a second page, and playing a next recommended video of the target recommended video in the second page; receiving a fourth preset operation in the preset application, wherein the fourth preset operation includes an operation of switching to the last recommended video; and responsive to the fourth preset operation, displaying the first page, and playing the target recommended video in the first page. In a case of determining that the interest tag selection is not completed, it is convenient for the user to quickly switch back to the target recommended video and restart or continue performing operations related to tag selection, which avoids a situation of missing an opportunity of tag selection due to operations such as a mistaken touch of the user and the like, which makes it difficult to find the target recommended video. For example, when the target recommended video is played again, a previous record of interest tag selection made by the user can be cleared, or can be continuously displayed, which is not limited specifically. The case where the second preset condition is met can include, for example, that the user actively triggers playing of the next recommended video, or that an instruction for completion of the interest tag selection has not been received within a specified time period, so the next recommended video is automatically played.

Figure 3:
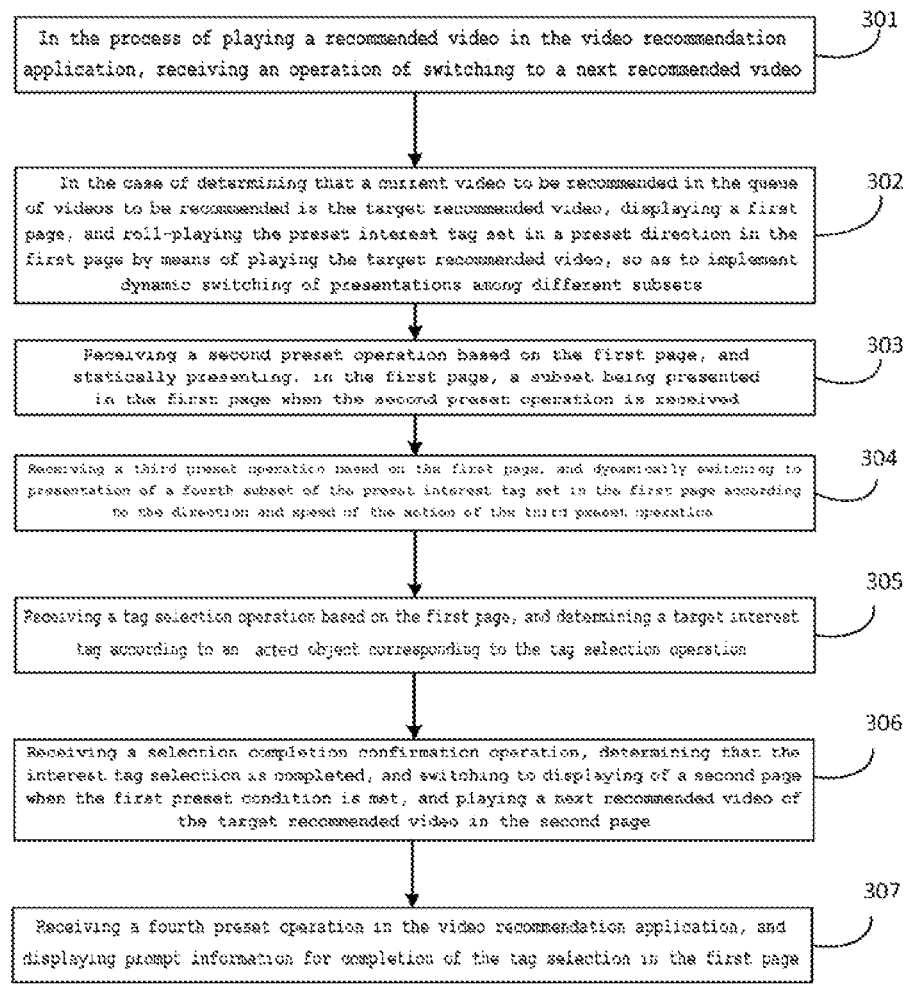
FIG. 3 is a schematic flowchart of a processing method based on interest tag as provided in an embodiment of the present disclosure.

FIG. 3 is a schematic flowchart of a processing method based on interest tag as provided in an embodiment of the present disclosure. The embodiment of the present disclosure is refined based on a plurality of exemplary solutions in the foregoing embodiments and explained with the preset application being exemplified as a video recommendation application. The method comprises the following steps:

Step 301, in the process of playing the recommended video in the video recommendation application, receiving an operation of switching to a next recommended video.

In the step, the operation of switching to the next recommended video is, for example, a slide-up operation.

Figure 4:
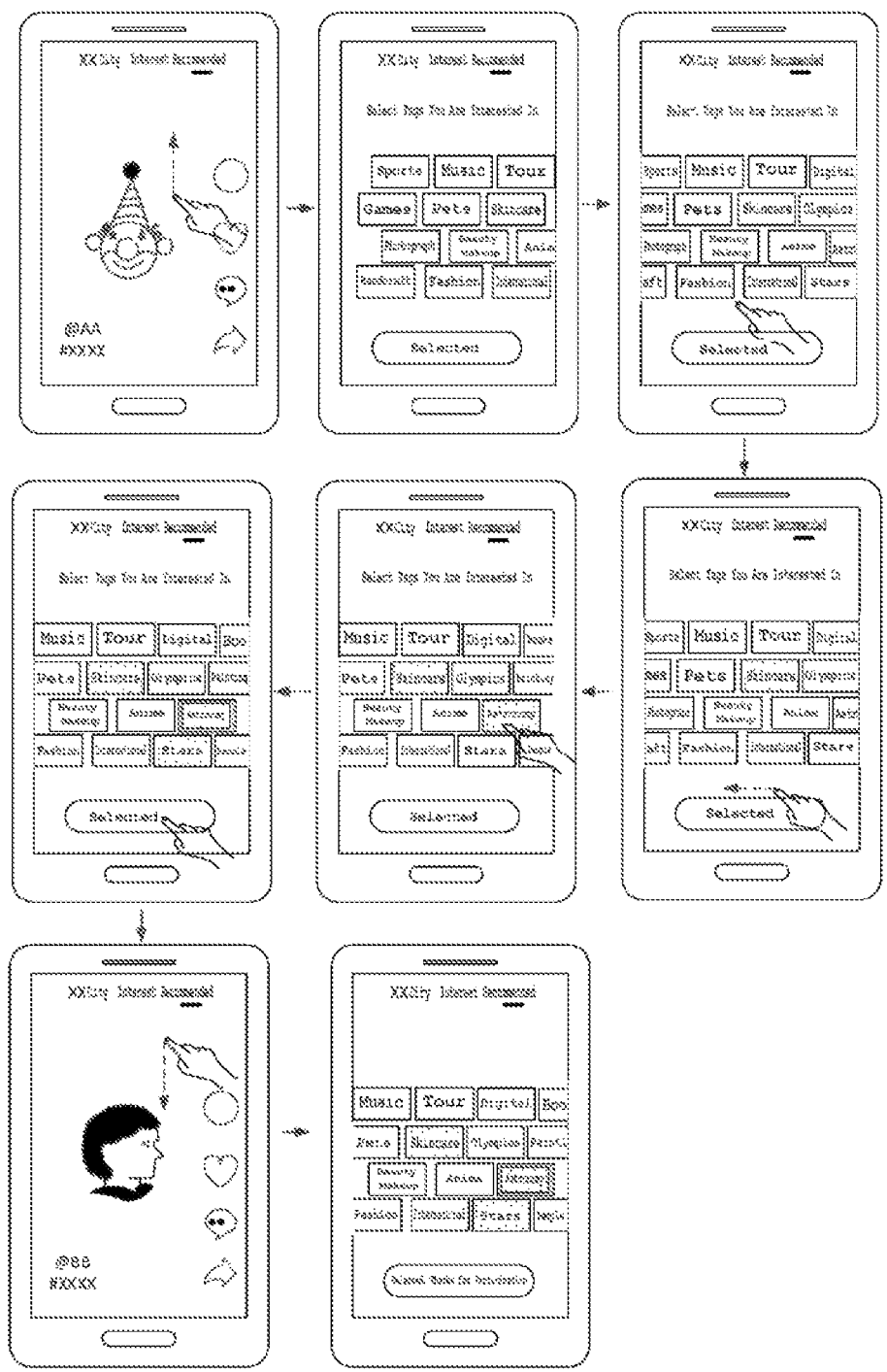
FIG. 4 is a schematic diagram of interface interaction as provided in an embodiment of the present disclosure.

FIG. 4 is a schematic diagram of interface interaction as provided in an embodiment of the present disclosure. As shown in FIG. 4, in a process of playing a recommended video, in which a clown is displayed, in a video recommendation application, a user can switch to a next video by inputting a slide-up operation.

Step 302, in the case of determining that the current video to be recommended in the queue of videos to be recommended is the target recommended video, displaying a first page, and roll-playing the preset interest tag set in a preset direction in the first page by means of playing the target recommended video, so as to realize dynamic switching of presentations among different subsets.

In the step, the interest tags in the preset interest tag set are sorted in a preset sorting mode, and the number of the interest tags in the subset is more than one and less than the total number of the interest tags in the preset interest tag set.

Illustratively, when it is determined that the user needs to be reminded to select interest tags, the target recommended video can be inserted into a specified position in the queue of videos to be recommended in advance or temporarily. After the first preset operation is received, if it is determined that the current video to be recommended in the queue of videos to be recommended is the target recommended video, the playing can be switched to playing of the target recommended video.

As shown in FIG. 4, the interest tags exist in the target recommended video in form of a touch control. When the target recommended video starts to be played, a preset interest tag set can be automatically roll-played from left to right, and a speed of the roll-playing can be set in advance.

Step 303, receiving a second preset operation based on the first page, and statically presenting the subset being displayed in the first page in the first page when the second preset operation is received.

Illustratively, the second preset operation can be, for example, a click operation for pausing the roll-playing. When the second preset operation is received, the roll-playing is paused, and the interest tags being displayed stay and are displayed in the first page when the second preset operation is received, with positions of the multiple interest tags unchanged.

Step 304, receiving a third preset operation based on the first page, and dynamically switching to presentation of a fourth subset of the preset interest tag set in the first page according to the direction and speed of the action of the third preset operation.

Illustratively, the third preset operation can be a transverse slide operation, and the user can input a left slide operation to cause the following interest tags that are not presented to appear on the right side of the first page, or can input a right slide operation to cause the interest tags that have just been presented to appear on the left side of the first page. The dynamic switching speed of the interest tags can be determined according to the slide speed when the user inputs the slide operation, so that the user can obtain a smoother sense of control.

Step 305, receiving a tag selection operation based on the first page, and determining a target interest tag according to an acted object corresponding to the tag selection operation.

Illustratively, when the user decides to select a certain interest tag, the interest tag can be clicked, and the clicked interest tag can be changed to a selected state. As shown in FIG. 4, a background color of the selected interest tag can change. The user can select interest tags according to his or her own actual condition during the presentation of the interest tags.

Step 306, receiving a selection completion confirmation operation, determining that the interest tag selection is completed, and when a first preset condition is met, switching to displaying of a second page, and playing a next recommended video of the target recommended video in the second page.

As shown in FIG. 4, when the user has selected several interest tags and determines that his or her selection is completed, the selection completion confirmation operation can be input by triggering the "selected" button, and after a preset time period (e.g., 2 seconds), automatically switching to displaying of a next recommended video if the user does not perform a slide-up or slide-down operation.

In the step, the next recommended video can be determined according to the target interest tags. For example, the queue of videos to be recommended is updated according to the target interest tags, and a first recommended video in the updated queue of videos to be recommended is determined as a next recommended video.

Step 307, receiving a fourth preset operation in the video recommendation application, and displaying prompt information of completion of the tag selection in the first page.

In the step, the fourth preset operation is an operation of switching to the last recommended video. As shown in FIG. 4, when the user inputs a slide-down operation and returns to the first page, the prompt information of completion of the tag selection is displayed, such as "selected, thank you for participation" in FIG. 4. Certainly, the prompt information can be in other forms, which are not limited specifically.

In addition, a modification control can also be displayed in the first page, and the user can modify the selected interest tags by means of triggering the modification control.

The processing method based on interest tag as provided in the embodiments of the present disclosure can be applied to a video recommendation application. By means of playing a target recommended video containing interest tags in a video recommendation page, the effect of presenting interest tags in a dynamic effect video style can be realized. A preset interest tag set can be automatically roll-played just when entering the video recommendation page corresponding to the target recommended video. The automatic roll-playing can play a prompting role of operation mode to some extent for a user. The user can pause the roll-playing by touching the screen, and autonomously control the dynamic switching of the interest tags by a slide operation, which can present more interest tags, improve the utilization of display space of a page, optimize the presentation effect of interest tags, and enhance interactivity and interestingness. In addition, the target recommended video appears between two recommended videos, the switching mode is consistent with the switching mode of the recommended videos, which can weaken the sense of interruption for the user and ensure a good interactive experience.

Figure 5:
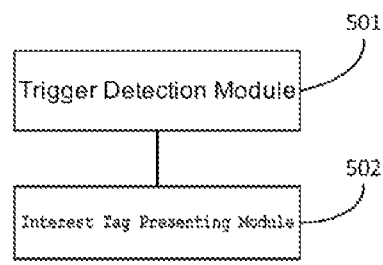
FIG. 5 is a structural block diagram of a processing apparatus based on interest tag as provided in an embodiment of the present disclosure.

FIG. 5 is a structural block diagram of a processing apparatus based on interest tag as provided in an embodiment of the present disclosure. The apparatus can be implemented by software and/or hardware, can be generally integrated in an electronic device, and can perform an interest tag based processing by performing the processing method based on interest tag. As shown in FIG. 5, the apparatus comprises:

a trigger detecting module 501, configured to detect whether an interest tag presentation event is triggered in a process of presenting information streams in a preset application;

an interest tag presenting module 502, configured to, when it is detected that the interest tag presentation event is triggered, display a first page, and dynamically switch presentations of different subsets of a preset interest tag set in the first page, wherein the number of interest tags in each of the subsets is more than one and less than a total number of the interest tags in the preset interest tag set.

In the process of presenting information streams in a preset application, the processing apparatus based on interest tag as provided in the embodiment of the present disclosure detects that an interest tag presentation event is triggered, displays a first page, and dynamically switches presentations of different subsets of a preset interest tag set in the first page, wherein the number of interest tags in each of the subsets is more than one and less than the total number of the interest tags in the preset interest tag set. By adopting the foregoing technical solution, the interest tags can be presented in the process of presenting information streams by the preset application, so that a user can have an opportunity to dynamically adjust the interest tags in the process of using the preset application. By means of dynamically switching the presentations of different interest tag subsets, more interest tags can be presented to the user, the utilization of display space of a page can be improved, the presentation effect of the interest tags can be optimized, and the interactivity and interestingness can be enhanced.

For example, the interest tag presenting module includes:
a first subset presenting unit, configured to display a first page, and present a first subset of a preset interest tag set in the first page;
a first preset operation receiving unit, configured to receive a first preset operation based on the first page;
a second subset presenting unit, configured to dynamically switch to presentation of a second subset of the preset interest tag set in the first page according to the direction and/or speed of the action of the first preset operation.

For example, the dynamically switching presentations of different subsets in a preset interest tag set in the first page includes: playing the preset interest tag set by automatically sliding in a preset direction in the first page, to realize dynamic switching of presentations among different subsets, wherein the interest tags in the preset interest tag set are sorted in a preset sorting mode.

For example, the apparatus further comprises:
a second preset operation receiving module, configured to receive a second preset operation based on the first page in the process of automatically slide-playing a preset interest tag set in a preset direction in the first page;
a third subset presenting module, configured to statically present a third subset of the preset interest tag set in the first page, responsive to the second preset operation.

For example, the third subset is the same as the subset being presented in the first page when the second preset operation is received.

For example, the apparatus further comprises:
a third preset operation receiving module, configured to receive a third preset operation based on the first page after statically presenting the third subset of the preset interest tag set in the first page;
a fourth subset presenting module, configured to dynamically switch to presentation of a fourth subset of the preset interest tag set in the first page according to the direction and/or speed of the action of the third preset operation.

For example, the apparatus further comprises:
a preset interest tag set determining module, configured to, before the displaying the first page, determine at least one of the number, the tag content and the sorting sequence of the interest tags in the preset interest tag set according to the recommended content browsing history and/or the feedback to the historical recommended content of the current user.

For example, the apparatus further comprises:
a tag selection operation receiving module, configured to receive a tag selection operation based on the first page;
a target interest tag determining module, configured to determine a target interest tag according to an acted object corresponding to the tag selection operation;
a content recommending module, configured to perform content recommendation based on the target interest tag.

For example, the preset application includes a video recommendation application, the first page includes a page for playing a recommended video, and the preset interest tag set is included in the video content of the target recommended video.

For example, the detecting that an interest tag presentation event is triggered includes: receiving an operation of switching to a next recommended video, a current video to be recommended in the queue of videos to be recommended being the target recommended video; the interest tag presenting module is configured to: when detecting that an interest tag presentation event is triggered, display a first page, and play the target recommended video in the first page, so as to realize dynamic switching of presentations of different subsets of the preset interest tag set in the first page.

For example, the apparatus further comprises:
a second page displaying module, configured to, in a case of determining that the interest tag selection is completed, when a first preset condition is met, switch to displaying of a second page, and play a next recommended video of the target recommended video in the second page;
a fourth preset operation receiving module, configured to receive a fourth preset operation in the preset application, wherein the fourth preset operation includes an operation of switching to a last recommended video;
a prompt information displaying module, configured to, responsive to the fourth preset operation, display the first page, and display prompt information for completion of the tag selection in the first page.

For example, the second page displaying module is further configured to, in a case of determining that the interest tag selection is not completed, when a second preset condition is met, switch to displaying of a second page, and play a next recommended video of the target recommended video in the second page;
the interest tag presenting module is further configured to: responsive to the fourth preset operation, display the first page, and play the target recommended video in the first page.

Figure 6:
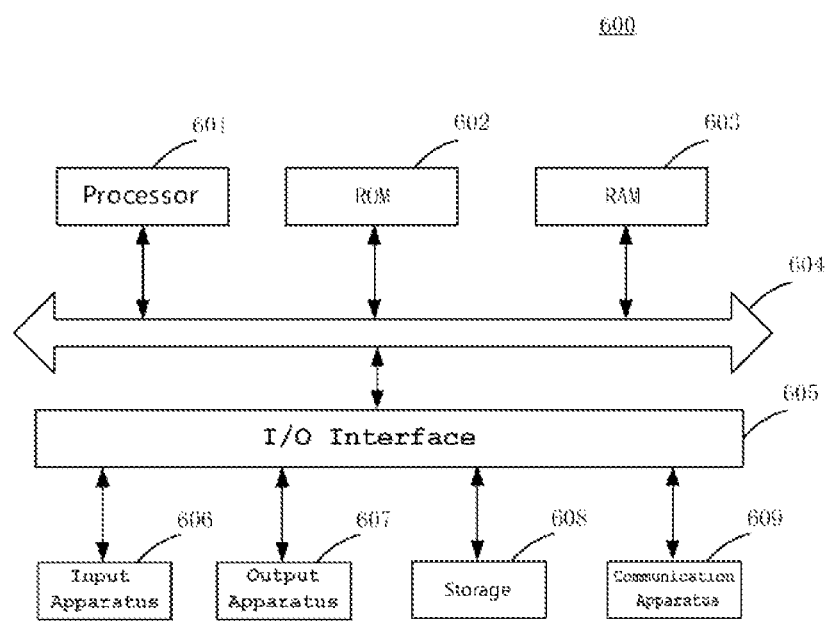
FIG. 6 is a structural block diagram of an electronic device as provided in an embodiment of the present disclosure.

Referring now to FIG. 6, a structural block diagram of an electronic device 600 adaptive to implement the embodiments of the present disclosure is shown. The electronic device in the embodiments of the present disclosure can include, but are not limited to, mobile terminals such as mobile phones, notebook computers, digital broadcast receivers, personal digital assistants (PDAs), tablet computers (PADs), portable multimedia players (PMPs), in-vehicle terminals (e.g., in-vehicle navigation terminals), and the like, as well as fixed terminals such as digital TVs, desktop computers, and the like. The electronic device shown in FIG. 6 is only an example, and should not bring any limitation to the functions and the scope of use of the embodiments of the present disclosure.

As shown in FIG. 6, the electronic device 600 can comprise a processor (e.g., a central processing unit, a graphics processor, etc.) 601 that can perform various suitable actions and processes according to a program stored in a Read Only Memory (ROM) 602 or a program loaded from a storage 608 onto a Random Access Memory (RAM) 603. In the RAM 603, various programs and data required for operations of the electronic device 600 are also stored. The processor 601, the ROM 602, and the RAM 603 are connected to each other via a bus 604. An input/output (I/O) interface 605 is also connected to the bus 604.

Generally, the following apparatuses can be connected to the I/O interface 605: input apparatus 606 including, for example, a touch screen, a touch pad, a keyboard, a mouse, a camera, a microphone, an accelerometer, a gyroscope, and the like; output apparatus 607 including, for example, a Liquid Crystal Display (LCD), a speaker, a vibrator, and the like; storage 608 including, for example, a magnetic tape, a hard disk, and the like; and a communication apparatus 609. The communication apparatus 609 can allow the electronic device 600 to communicate with other devices in a wireless or wired way to exchange data. Although FIG. 6 illustrates an electronic device 600 having various apparatuses, it should be understood that not all illustrated apparatuses are required to be implemented or provided. More or fewer apparatuses can be alternatively implemented or provided.

According to the embodiment of the present disclosure, the process described above with reference to the flowchart can be implemented as a computer software program. For example, the embodiment of the present disclosure includes a computer program product comprising a computer program carried on a non-transitory computer readable medium, the computer program containing program codes configured to perform the method illustrated by the flowchart. In such an embodiment, the computer program can be downloaded and installed from a network by the communication apparatus 609, or installed from the storage 608, or installed from the ROM 602. The computer program, when executed by the processor 601, performs the foregoing functions defined in the method of the embodiment of the present disclosure.

It needs to be noted that the foregoing computer readable medium of the present disclosure can be a computer readable signal medium or a computer readable storage medium or any combination of both. A computer readable storage medium can be, for example, but not limited to, an electronic, magnetic, optical, electromagnetic, infrared, or semiconductor system, apparatus, or component, or any combination of the foregoing. More specific examples of the computer readable storage medium can include, but are not limited to: an electrical connection having one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage device, a magnetic storage device, or any suitable combination of the foregoing. In the present disclosure, a computer readable storage medium can be any tangible medium that contains or stores a program for use by or in combination with an instruction execution system, apparatus, or device. In contrast, in the present disclosure, a computer readable signal medium can include a propagated data signal with computer readable program code embodied therein, in baseband or as part of carrier wave. Such a propagated data signal can take a variety of forms, including, but not limited to, an electromagnetic signal, an optical signal, or any suitable combination of the foregoing. A computer readable signal medium can also be any computer readable medium in addition to the computer readable storage medium. The computer readable signal medium can transmit, propagate, or transport a program for use by or in combination with an instruction execution system, apparatus, or device. Program code contained on a computer readable medium can be transmitted using any suitable medium, including but not limited to: electrical wires, optical cables, radio frequency (RF), etc., or any suitable combination of the foregoing.

The foregoing computer readable medium can be contained in the foregoing electronic device, or can be standalone and not assembled into the electronic device.

The foregoing computer readable medium carries one or more programs which, when executed by the electronic device, cause the electronic device to: in a process of presenting information streams in a preset application, detect that an interest tag presentation event is triggered; display a first page, and dynamically switch presentations of different subsets of a preset interest tag set in the first page, wherein the number of interest tags in each of the subsets is more than one and less than the total number of interest tags in the preset interest tag set.

Computer program code for executing operations of the present disclosure can be written in one or more programming languages or a combination thereof, and the foregoing programming languages include, but are not limited to, object oriented programming languages such as Java, Smalltalk, C++, as well as conventional procedural programming languages, such as "C" programming language or similar programming languages. The program code can be executed entirely on a user computer, partly executed on a user computer, executed as a stand-alone software package, executed partly on a user computer and partly on a remote computer, or executed entirely on a remote computer or server. In a case where a remote computer is involved, the remote computer can be connected to the user computer via any type of network, including a Local Area Network (LAN) or a Wide Area Network (WAN), or can be connected to an external computer (for example, a connection via Internet by means of an Internet service provider).

The flowchart and block diagrams in the figures illustrate architecture, functions, and operations of possible implementations of systems, methods and computer program products according to various embodiments of the present disclosure. In this regard, each block in the flowchart or block diagrams can represent a module, a program segment, or a portion of code, which contains one or more executable instructions for implementing the specified logical function(s). It should also be noted that, in some implementations as alternatives, the functions labeled in the blocks can occur in an order different from that labeled in the figures. For example, two blocks shown in succession may, in fact, be executed substantially in parallel, or they can be sometimes executed in the reverse order, depending upon the functions involved. It will also be noted that each block of the block diagrams and/or flowchart, and combinations of blocks in the block diagrams and/or flowchart, can be implemented by exclusive hardware-based systems that perform the specified functionalities or operations, or can be implemented by combinations of exclusive hardware and computer instructions.

The modules involved in the embodiments of the present disclosure as described herein can be implemented by means of software or hardware. The name of the module does not constitute a limitation on the module itself in certain cases, for example, the trigger detection module can also be described as "a module that detects whether an interest tag presentation event is triggered in a process of presenting information streams in a preset application".

The functions described herein above can be performed, at least in part, by one or more hardware logic components. For example, without limitation, exemplary types of available hardware logic components include: field Programmable Gate Arrays (FPGAs), Application Specific Integrated Circuits (ASICs), Application Specific Standard Products (ASSPs), system on a chip (SOCs), Complex Programmable Logic devices (CPLDs), and the like.

In the context of the present disclosure, a machine readable medium can be a tangible medium that can contain or store a program for use by or in combination with an instruction execution system, apparatus, or device. The machine readable medium can be a machine readable signal medium or a machine readable storage medium. A machine readable medium can include, but is not limited to, an electronic, magnetic, optical, electromagnetic, infrared, or semiconductor system, apparatus, or device, or any suitable combination of the foregoing contents. More specific examples of the machine readable storage medium would include an electrical connection based on one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage, a magnetic storage, or any suitable combination of the foregoing contents.

According to one or more embodiments of the present disclosure, there is provided a processing method based on interest tag, comprising:

in a process of presenting information streams in a preset application, detecting that an interest tag presentation event is triggered;

displaying a first page, and dynamically switching presentations of different subsets of a preset interest tag set in the first page, wherein the number of interest tags in each of the subsets is more than one and less than the total number of interest tags in the preset interest tag set.

For example, the displaying a first page, and dynamically switching presentations of different subsets of a preset interest tag set in the first page includes: displaying a first page, and presenting a first subset of a preset interest tag set in the first page; receiving a first preset operation based on the first page; dynamically switching to presentation of a second subset of the preset interest tag set in the first page according to the direction and/or speed of the action of the first preset operation.

For example, the dynamically switching presentations of different subsets of a preset interest tag set in the first page includes: playing a preset interest tag set by automatically sliding in a preset direction in the first page to realize dynamic switching of presentations among different subsets, wherein the interest tags in the preset interest tag set are sorted in a preset sorting mode.

For example, in the process of playing a preset interest tag set by automatically sliding in a preset direction in the first page, the method further comprises: receiving a second preset operation based on the first page; responsive to the second preset operation, statically presenting a third subset of the preset interest tag set in the first page.

For example, the third subset is the same as the subset being presented in the first page when the second preset operation is received.

For example, after statically presenting the third subset of the preset interest tag set in the first page, the method further comprises: receiving a third preset operation based on the first page; dynamically switching to presentation of a fourth subset of the preset interest tag set in the first page according to a direction and/or a speed of action of the third preset operation.

For example, before the displaying the first page, the method further comprises: determining at least one of a number, a tag content and a sorting sequence of the interest tags in the preset interest tag set according to a recommended content browsing history and/or feedback to the historical recommended contents of a current user.

For example, the method further comprises: receiving a tag selection operation based on the first page; determining a target interest tag according to an acted object corresponding to the tag selection operation; performing content recommendation based on the target interest tag.

For example, the preset application includes a video recommendation application, the first page includes a page for playing a recommended video, and the preset interest tag set is included in video content of the target recommended video.

For example, the detecting that an interest tag presentation event is triggered includes: receiving an operation of switching to a next recommended video, a current video to be recommended in the queue of videos to be recommended being the target recommended video; the displaying a first page and dynamically switching presentations of different subsets of a preset interest tag set in the first page includes: displaying the first page, and playing the target recommended video in the first page to realize dynamic switching of presentations of different subsets of the preset interest tag set in the first page.

For example, the method further comprises: in a case of determining that the interest tag selection is completed, when a first preset condition is met, switching to displaying of a second page, and playing a next recommended video of the target recommended video in the second page; receiving a fourth preset operation in the preset application, wherein the fourth preset operation includes an operation of switching to a last recommended video; responsive to the fourth preset operation, displaying the first page, and displaying prompt information for completion of the tag selection in the first page.

For example, the method further comprises: in a case of determining that the interest tag selection is not completed, when a second preset condition is met, switching to displaying of a second page, and playing a next recommended video of the target recommended video in the second page; receiving a fourth preset operation in the preset application, wherein the fourth preset operation includes an operation of switching to a last recommended video; responsive to the fourth preset operation, displaying the first page, and playing the target recommended video in the first page.

According to one or more embodiments of the present disclosure, there is provided a processing apparatus based on interest tag, comprising:

a trigger detecting module, configured to detect whether an interest tag presentation event is triggered in a process of presenting information streams in a preset application program;

an interest tag presenting module, configured to, when it is detected that the interest tag presentation event is triggered, display a first page, and dynamically switch presentations of different subsets of a preset interest tag set in the first page, wherein a number of interest tags in each of the subsets is more than one and less than a total number of interest tags in the preset interest tag set.

Further, while various operations are depicted in a particular order, this should not be understood as requiring that such operations be performed in the particular order as shown or in the sequential order. Under certain circumstances, multitasking and parallel processing can be advantageous. Likewise, while several specific implementation details are contained in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

What is claimed is:

1. A processing method based on interest tag, comprising:
receiving an operation to switch to a next recommended video in a queue of videos to be recommended when playing a recommended video in a preset application;
detecting that an interest tag presentation event is triggered in response to determining that the next recommended video is a target recommended video, the target recommended video including a preset interest tag set within its video content;
displaying a first page; and
playing the target recommended video in the first page to realize playing the preset interest tag set in the first page,
wherein playing the preset interest tag set includes dynamically switching presentations of different subsets of a preset interest tag set in the first page, and
wherein a number of interest tags in each of the subsets is more than one and less than a total number of interest tags in the preset interest tag set.

2. The method according to claim 1, wherein the dynamically switching presentations of different subsets of a preset interest tag set in the first page, comprises:
displaying the first page, and presenting a first subset of a preset interest tag set in the first page;
receiving a first preset operation based on the first page;
dynamically switching to presentation of a second subset of the preset interest tag set in the first page according to at least one of a direction and a speed of action of the first preset operation.

3. The method according to claim 1, wherein the dynamically switching presentations of different subsets of a preset interest tag set in the first page comprises:
playing the preset interest tag set by automatically sliding in a preset direction in the first page, so as to realize dynamic switching of presentations among different subsets, wherein the interest tags in the preset interest tag set are sorted in a preset sorting mode.

4. The method according to claim 3, in the process of playing the preset interest tag set by automatically sliding in a preset direction in the first page, the method further comprising:
receiving a second preset operation based on the first page;
responsive to the second preset operation, statically presenting a third subset of the preset interest tag set in the first page.

5. The method according to claim 4, wherein the third subset is the same as the subset being presented in the first page when the second preset operation is received.

6. The method according to claim 4, after the statically presenting the third subset of the preset interest tag set in the first page, the method further comprising:
receiving a third preset operation based on the first page;
dynamically switching to presentation of a fourth subset of the preset interest tag set in the first page according to at least one of a direction and a speed of action of the third preset operation.

7. The method according to claim 1, before the displaying a first page, the method further comprising:
determining at least one of a number, a tag content and a sorting sequence of the interest tags in the preset interest tag set according to at least one of a recommended content browsing history and a feedback to a historical recommended content of a current user.

8. The method according to claim 1, further comprising:
receiving a tag selection operation based on the first page;
determining a target interest tag according to an acted object corresponding to the tag selection operation;
performing content recommendation based on the target interest tag.

9. The method according to claim 1, wherein the preset application includes a video recommendation application.

10. The method according to claim 1, further comprising:
responsive to determining that an interest tag selection is completed and a first preset condition is met, switching to displaying of a second page, and playing a next recommended video of the target recommended video in the second page;
receiving a fourth preset operation in the preset application, wherein the fourth preset operation includes an operation of switching to a last recommended video;
responsive to the fourth preset operation, displaying the first page, and displaying prompt information for completion of a tag selection in the first page.

11. The method according to claim 1, further comprising:
responsive to determining that an interest tag selection is not completed and a second preset condition is met, switching to displaying of a second page, and playing a next recommended video of the target recommended video in the second page;
receiving a fourth preset operation in the preset application, wherein the fourth preset operation includes an operation of switching to a last recommended video;
responsive to the fourth preset operation, displaying the first page, and playing the target recommended video in the first page.

12. An electronic device, comprising:
a memory; a processor; and
a computer program stored in the memory and executable by the processor, the processor, when executing the computer program, implementing the following operations:
receiving an operation to switch to a next recommended video in a queue of videos to be recommended in a process of playing a recommended video in a preset application;

detecting that an interest tag presentation event is triggered in response to determining that the next recommended video is a target recommended video, the target recommended video including a preset interest tag set within its video content;

displaying a first page; and playing the target recommended video in the first page to realize playing the preset interest tag set in the first page, wherein playing the preset interest tag set includes dynamically switching presentations of different subsets of a preset interest tag set in the first page, and wherein a number of interest tags in each of the subsets is more than one and less than a total number of interest tags in the preset interest tag set.

13. The electronic device according to claim 12, wherein dynamically switching presentations of different subsets of a preset interest tag set in the first page, comprises:

displaying the first page, and presenting a first subset of a preset interest tag set in the first page;

receiving a first preset operation based on the first page;

dynamically switching to presentation of a second subset of the preset interest tag set in the first page according to at least one of a direction and a speed of action of the first preset operation.

14. The electronic device according to claim 12, wherein the dynamically switching presentations of different subsets of a preset interest tag set in the first page comprises:

playing the preset interest tag set by automatically sliding in a preset direction in the first page, so as to realize dynamic switching of presentations among different subsets, wherein the interest tags in the preset interest tag set are sorted in a preset sorting mode.

15. The electronic device according to claim 14, in the process of playing the preset interest tag set by automatically sliding in a preset direction in the first page, the operations further comprising:

receiving a second preset operation based on the first page;

responsive to the second preset operation, statically presenting a third subset of the preset interest tag set in the first page.

16. A non-transitory computer readable storage medium, on which a computer program is stored, the computer program, when executed by a processor, implementing the following operations:

receiving an operation to switch to a next recommended video in a queue of videos to be recommended in a process of playing a recommended video in a preset application;

detecting that an interest tag presentation event is triggered in response to determining that the next recommended video is a target recommended video, the target recommended video including a preset interest tag set within its video content;

displaying a first page and playing the target recommended video in the first page to realize playing the preset interest tag set in the first page, wherein playing the preset interest tag set includes dynamically switching presentations of different subsets of a preset interest tag set in the first page, and wherein a number of interest tags in each of the subsets is more than one and less than a total number of interest tags in the preset interest tag set.

17. The non-transitory computer readable storage medium according to claim 16, wherein dynamically switching presentations of different subsets of a preset interest tag set in the first page, comprises:

displaying the first page, and presenting a first subset of a preset interest tag set in the first page;

receiving a first preset operation based on the first page;

dynamically switching to presentation of a second subset of the preset interest tag set in the first page according to at least one of a direction and a speed of action of the first preset operation.

18. The non-transitory computer readable storage medium according to claim 16, wherein the dynamically switching presentations of different subsets of a preset interest tag set in the first page comprises:

playing the preset interest tag set by automatically sliding in a preset direction in the first page, so as to realize dynamic switching of presentations among different subsets, wherein the interest tags in the preset interest tag set are sorted in a preset sorting mode.

19. The non-transitory computer readable storage medium according to claim 18, in the process of playing the preset interest tag set by automatically sliding in a preset direction in the first page, the operations further comprising:

receiving a second preset operation based on the first page;

responsive to the second preset operation, statically presenting a third subset of the preset interest tag set in the first page.

* * * * *